(12) United States Patent
Repak

(10) Patent No.: US 7,398,249 B2
(45) Date of Patent: Jul. 8, 2008

(54) ACH DEBIT BLOCKING METHOD AND SYSTEM

(75) Inventor: Walter C. Repak, Bloomfield, NJ (US)

(73) Assignee: The Bank of New York Mellon Corporation, New York, NY (US)

( * ) Notice: Subject to any disclaimer, the term of this patent is extended or adjusted under 35 U.S.C. 154(b) by 1328 days.

(21) Appl. No.: 10/162,568

(22) Filed: Jun. 6, 2002

(65) Prior Publication Data

US 2003/0229586 A1    Dec. 11, 2003

(51) Int. Cl.
  *G06Q 40/00* (2006.01)
(52) U.S. Cl. .............................. 705/39; 705/37; 705/40; 705/44
(58) Field of Classification Search ..................... 705/39
  See application file for complete search history.

(56) References Cited

U.S. PATENT DOCUMENTS

2003/0158811 A1* 8/2003 Sanders et al. ................. 705/39

OTHER PUBLICATIONS

NACHA Rule Making Process, Operations Bulletin, Aug. 15, 2000, nacha.org/ACH_Rules/Rule_Making_Process/.../2000_bulletins_3.doc (Yahoo.com search included).*

BankersOnline.com, Postings Re: unauthorized ACH, Feb. to Oct. 2001, www.bankersonline.com/forum/ubbthresad.php/ubb/showflat/Number6612/site_.*

2008 ACH Rules—Corporate Edition, Organization of the ACH Rules, Jan. 2008.

* cited by examiner

*Primary Examiner*—James P. Trammell
*Assistant Examiner*—Brian Fertig
(74) *Attorney, Agent, or Firm*—Pillsbury Winthrop Shaw Pittman LLP

(57) ABSTRACT

The invention provides a method and system for blocking fraudulent or incorrect Automated Clearing House (ACH) debits. In an embodiment of the invention, the number of fraudulent and incorrect ACH debits is significantly reduced by examining an ACH debit entry and determining if it is identified as a consumer-oriented transaction directed to a commercial account. Particularly, a number of computer programs is provided at a Receiving Depository Financial Institution (RDFI) to automatically return ACH debits to the Originating Depository Financial Institution (ODFI) via the ACH Operator if the standard entry code (SEC) identifies the transaction as a consumer oriented transaction and the paying account, i.e., Receiver, as a commercial account. Consumer ACH debits can be posted to a commercial account, however an immediate and automatic credit in an amount equal to the debit is applied to negate the debit. Within 24 hours, a message is returned to the Originator's ODFI specifying that the debit is unauthorized, thereby providing an audit trail of the unauthorized debit for all involved parties in the ACH network.

24 Claims, 3 Drawing Sheets

ACH DEBIT BLOCKING METHOD AND SYSTEM

FIELD OF INVENTION

The present invention relates to Automated Clearing House (ACH) electronic banking debit transactions, particularly to a method and system for blocking consumer-oriented ACH debit transactions from posting against a commercial bank account.

DESCRIPTION OF RELATED ART

The Automated Clearing House network is a highly reliable and efficient nationwide batch-oriented electronic funds transfer system that provides for the interbank clearing of electronic payments between participating depository financial institutions. First introduced in the early 1970s as a more efficient alternative to checks, ACH has evolved into a nationwide mechanism that processes electronically originated credit and debit transfers. The ACH network handles billions of payments annually.

ACH transactions are governed by the operating rules of the National Automated Clearing House Association (NACHA), which define the rights, obligations, and warranties of parties involved. NACHA is a trade association that develops operating rules and business practices for the ACH network as well as for other areas of electronic transactions. NACHA also works to facilitate the adoption of electronic payments in the areas of Internet commerce, electronic bill payment and presentment (EBPP), financial electronic data interchange (EDI), international payments, electronic checks, electronic benefits transfer (EBT), and student lending.

FIG. 1 illustrates a typical ACH transaction over an ACH network 100. Particularly, ACH network 100 comprises an Originator 110, an Originating Depository Financial Institution (ODFI) 120, an ACH Operator 130, a Receiving Depository Financial Institution (RDFI) 140, and a Receiver 150. Although only one ODFI and RDFI are shown in order to simplify the present discussion, the actual ACH network in use today comprises over 12,000 participating financial institutions. Originator 110 can be any individual, corporation, or other entity that initiates entries into the ACH network ODFI 120 is a participating financial institution that originates ACH entries at the request of and by agreement with its customers, such as Originator 110, and abides by the provisions of the NACHA operating rules and guidelines. ACH Operator 130 is a central clearing facility through which financial institutions 120 and 140 transmit or receive ACH entries. Presently, there are four ACH Operators: American Clearing House Association (ACHA), Federal Reserve, Electronic Payments Network, and Visa. RDFI 140 is any financial institution qualified to receive ACH entries and that agrees to abide by the NACHA operating rules and guidelines. Receiver 150 can be an individual, corporation, or other entity having a transaction account held at RDFI 150.

In a debit operation, Receiver 150 authorizes Originator 110 via authorization 105 to debit or credit a particular account held at RDFI 140. In a business transaction between a buyer and a seller, for example, Receiver 150 is typically the buyer and Originator 110 is the seller. After suitable authorization 105 is received, Originator 110 forwards appropriate transaction data 115 to ODFI 120, which then forwards a transaction file 125 to ACH Operator 130. Transaction file 125 typically comprises transaction data received by ODFI 120 from multiple Originators, which can be sorted by, for example, RDFI destination, and is usually sent on a daily basis. ACH Operator 130 distributes transactional information pertaining to each RDFI, e.g., RDFI 140, in an ACH file 135, the specific format of which is understood by one of ordinary skill in the art. RDFI 140 processes ACH file 135 and then debits or credits funds 145 to Receiver's 150 account. Generally, such a debit is reported by RDFI 140 to Receiver 150 via a monthly account statement or daily activity report.

ACH file 135 typically comprises an ACH company/batch header record and multiple detail records (herein referred to as ACH entries) associated with a number of accounts pertaining to RDFI Receivers, i.e., customers of a particular RDFI. An ACH entry typically consists of a data string of 94 characters that identifies and tracks a particular transaction. Each entry comprises a number of data fields, each designating one of many codes standardized by NACHA, the identification and interpretation of the standardized codes being apparent to one of ordinary skill in the art. One such field in the batch header record specifies a standard entry class (SEC) code, which is a three-character code identifying the formatting layout for a batch of ACH entries and designating the entry as "consumer" or "commercial" for application of relevant rules and regulations. Example SEC codes are: CCD (cash concentration and disbursement) used for corporate payment applications that provide the ability to collect and disburse funds and information between companies, CTX (commercial trade exchange) used for corporate payment applications originated by an Originator to pay or collect an obligation of such Originator and destined for the account of another organization, PPD (prearranged payment and deposit) used for debit and credit entries to a consumer account, ARC (accounts receivable entry), to specifically identify single-entry ACH debit transactions originated from converted consumer source documents (i.e., consumer checks) that have been provided to the Originator via U.S. mail or at a drop box location, POP (point-of-purchase) used by a merchant to initiate a one-time debit to a consumers account for the purchase of goods and/or services at the point of sale, RCK (represented check) used by a merchant to collect on a consumer check that has been returned through the check clearing system for non-sufficient or uncollected funds, TEL (telephone initiated) used to identify single entry consumer debit entry initiated pursuant to an oral authorization obtained from a Receiver via the telephone, and WEB (Internet-initiated entries) used to identify a consumer debit entry initiated pursuant to an authorization obtained from a Receiver via the Internet. NACHA continuously creates new SEC codes and eliminates old ones, therefore it should be apparent to one of ordinary skill in the art that other SEC codes not identified herein can be used.

Where payments are set up via computer to charge to an account, fraud, error, or omission can result in some cases, thereby causing funds to be transferred not only from the wrong account, but also from the wrong customer. Generally, when electronic instructions originate within the bank that makes the payment, strong controls and authorization procedures prevent improper account number entries. However, when the request for payment originates at a foreign computer system the opportunity for such authentication and account management are virtually eliminated. These foreign initiated transactions are often routed to the paying bank by submitting the instructions to an ACH Operator, which in turn sends the instruction to debit to the paying bank based upon its routing number.

Under ACH Rules, RDFIs must accept any ACH debit to their deposit accounts, unless the Receiver has requested that all ACH debits be blocked or some solely based on the specified Originator. ACH Rules require the Originator and its ODFI to warrant that they have a Receiver's authorization before issuing such debits. This rule has been in place for over 25 years since the beginning of ACH transactions. In recent years as Internet merchants have begun integrating ACH debits into their payment systems as a form of electronic money, they have often taken insufficient care to ensure that their customers have entered bank information from accounts, which really belong to them. There have been numerous cases of fraudulent debits to Receivers' accounts in the past few years, often stemming from Internet-based Originators providing consumer services. In these cases, ACH debit entries are being posted to commercial accounts, originated on behalf of consumers who do not have the authority to debit these accounts, but who enter commercial account numbers into the Internet paying services facilities.

Companies lose their right to immediate credit unless they discover and return the fraudulent entry within 24 hours. After 24 hours, companies are required to participate in an adjudication process, which often takes several months before a company gets reimbursed for the funds. Commercial entities, whether financial or corporate, typically do not react to unexpected fraudulent debits within the specified time period to allow uncontested and immediate charge-back of all items; i.e., often coming forward after several months have passed, forcing an RDFI to go through the lengthy adjudication process to regain the finds. Moreover, the adjudication process is very time consuming and expensive requiring a significant amount of forensic research and inter-bank coordination after the fact.

SUMMARY OF THE INVENTION

The present invention overcomes these and other deficiencies of the related art by providing an ACH consumer debit blocking method and system that automatically returns entries identified as consumer transactions, which post to commercial accounts, without requiring positive subscription by the account holder.

The number of erroneous or fraudulent ACH debits is significantly reduced by examining an ACH debit entry that is directed to a commercial account and determining if it relates to a non-commercial transaction, i.e., a consumer-oriented transaction. In an embodiment of the invention, an ACH debit is automatically returned to the ODFI via the ACH Operator if the SEC code identifies the transaction as a consumer-oriented transaction and the RDFI determines that the paying account, i.e., Receiver, is a commercial account. According to one aspect of the invention, the consumer-oriented ACH debits are posted to a commercial account, however an automatic credit in an amount equal to the debit is immediately applied to negate the debit. Thereafter, the debit is returned to the ODFI specifying that the debit is unauthorized, thereby providing an audit trail for all involved parties in the ACH network.

Prior solutions require RDFIs to gain active customer agreement to subscribe to a conventional ACH debit blocking service, e.g., a service that blocks all ACH debits. This is too time consuming because most customers don't understand the risk and often have a naive trust in their own capability to safeguard their accounts.

The invention allows the RDFI to cover all commercial accounts without requiring active subscription by their customers. Moreover, the invention reduces the time needed for resolving each fraudulent transaction to within the required 24 hour period because the action is automatic, thereby eliminating delays caused by manual review. By returning fraudulent ACH debits automatically, Receivers suffer no loss, and Originators can stop inadvertent fraudulent ACH debits very quickly, saving hundreds of thousands of dollars annually in potential losses. Moreover, since the customer no longer has to review daily bank accounts for these types of transactions manually, hundreds of man-hours are saved. Further, posting the debit to the commercial account and then immediately applying a credit provides a record for the Receiver for auditing purposes. Litigation to resolve disputes over ACH debits blocked by the present invention will decrease to a negligible amount if not eliminated completely.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE SPECIFIC EMBODIMENTS

Figure 1:
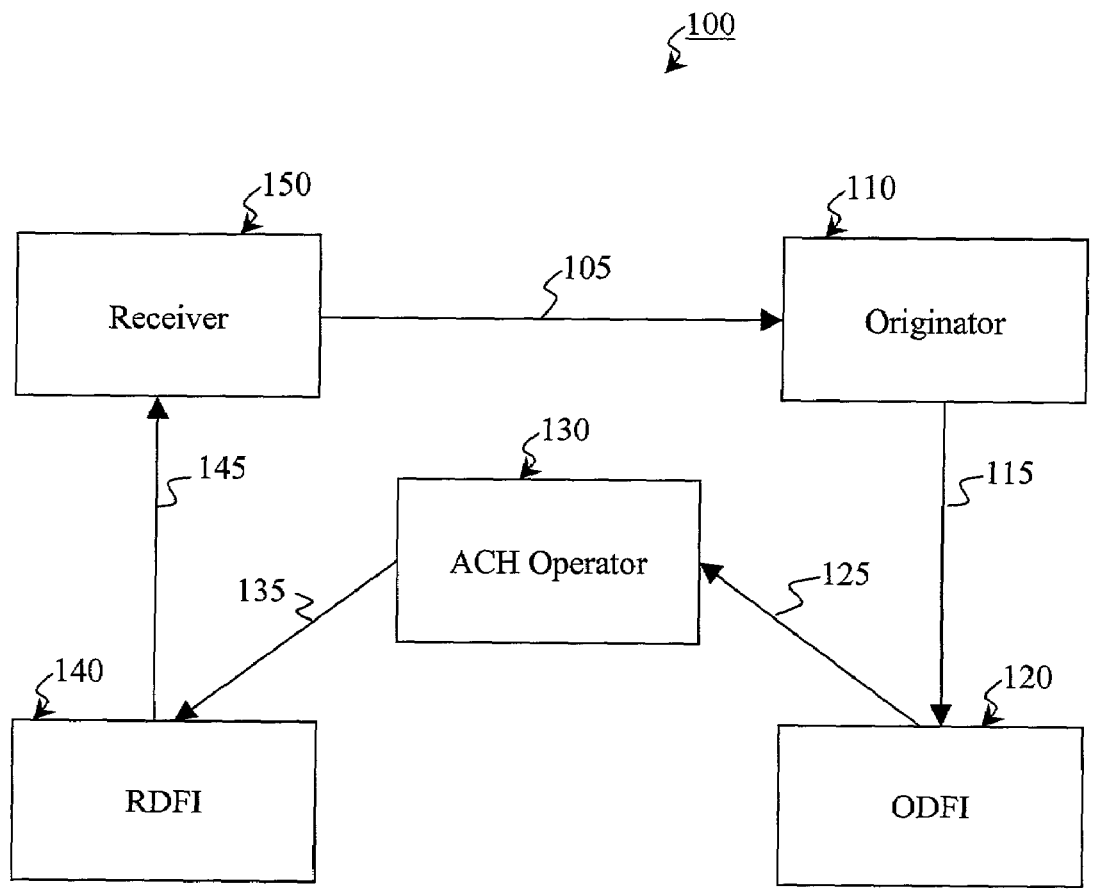
FIG. 1 is a block diagram of a conventional ACH debit process.
Figure 2:
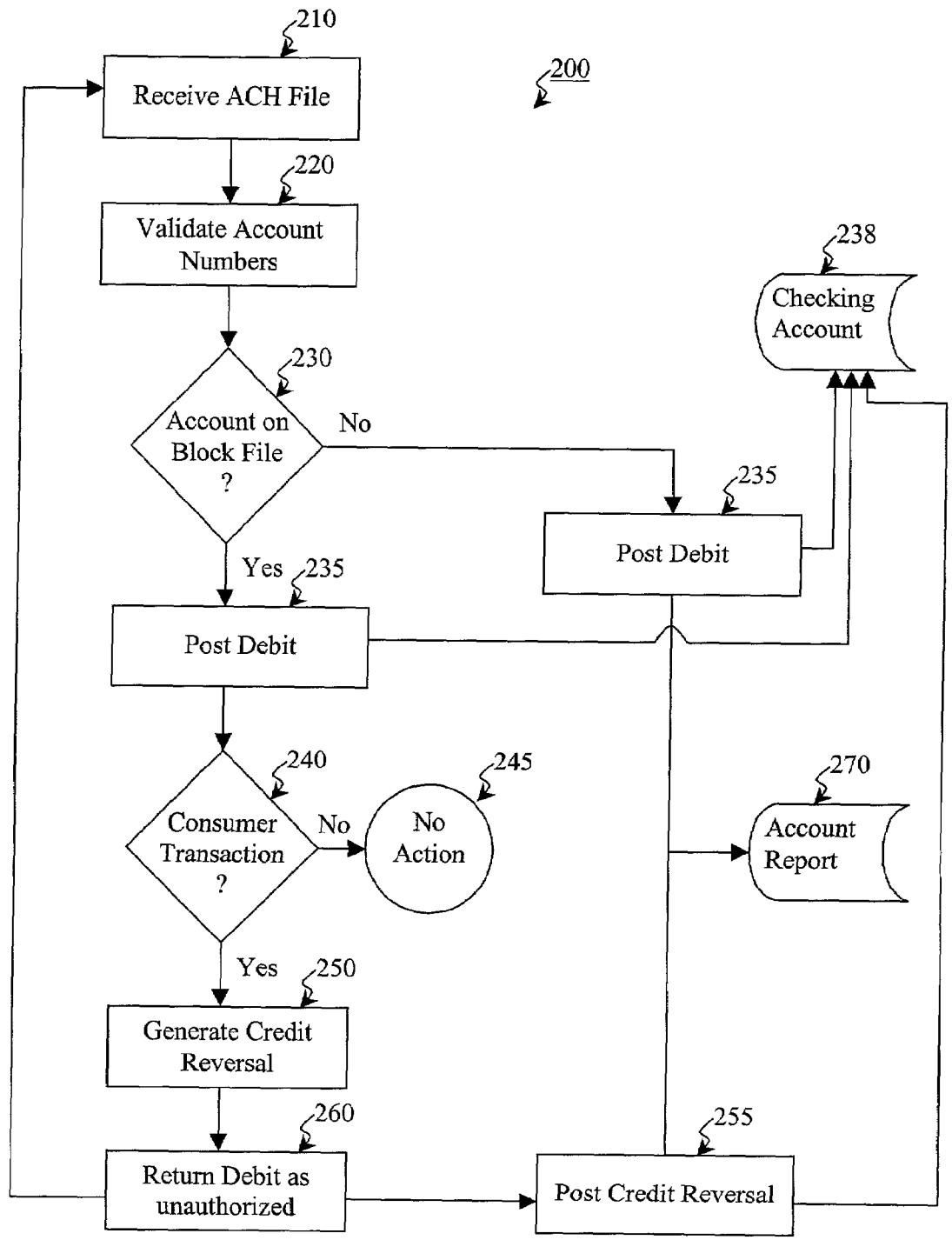
FIG. 2 is a flow diagram depicting a method of posting and recrediting ACH debits according to an embodiment of the invention.
Figure 3:
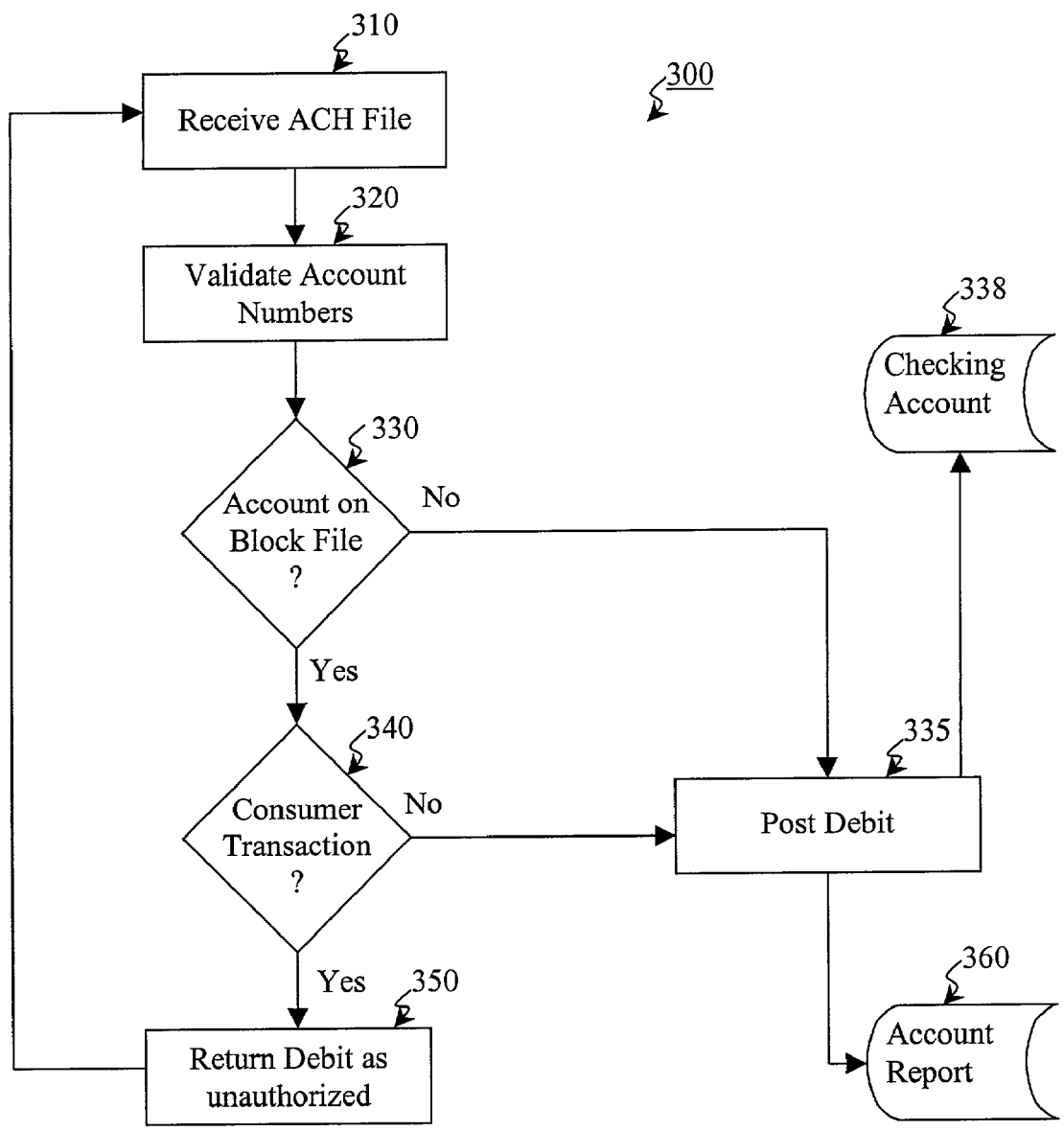
FIG. 3 is a flow diagram depicting a method of blocking ACH debits according to another embodiment of the invention.

Preferred embodiments of the present invention and their advantages may be understood by referring to FIGS. 2-3, which are described in the context of Automated Clearing House debit transactions. Nevertheless, the inventive concept can be adapted to the general processing of electronic payments within the banking industry involving reciprocating banking instructions for movement of funds associated with a transaction.

In a preferred embodiment of the invention, one or more computer programs are provided at an RDFI to automatically scrutinize ACH debit entries or instructions received from an ACH Operator. Particularly, these programs parse each debit requesting instruction received. If the instruction pertains to a consumer-oriented transaction that will debit a commercial account, the instruction is assumed to be unauthorized and therefore is immediately returned to the ODFI within 24 hours of posting without any action required by the Receiver.

FIG. 2 illustrates a method 200 of posting and recrediting ACH debits according to an embodiment of the invention. Specifically, an ACH batch file is received (step 210) at an RDFI from an ACH Operator. In a preferred embodiment, account numbers of the debit entries are validated (step 220) as serviced by the RDFI according to a standard procedure, implementation of which is apparent to one of ordinary skill in the art. For each debit, the corresponding account number to be debited is matched (step 230) against a list of commercial RDFI account numbers that are not allowed to post consumer-oriented debit entries. If a match is not found, the debit is allowed to post (step 235) to account 238 without further action. If a match is found, in addition to posting the debit (step 235) to the account 238, the debit is determined (step 240) whether or not to be directed toward a consumer account. For example, the SEC code associated with an entry is identified. In a preferred embodiment, all SEC codes other than CCD and CTX, such as, but not limited to PPD, WEB, TEL, RCK, ARC, and POP, are presumed to be consumer-oriented transaction. Moreover, CCD or CTX codes identify the entry as a commercial transaction. If the debit entry contains a CCD or CTX code, no further action is taken (step 245). If the debit entry is a consumer-oriented transaction, a credit reversal is generated (step 250) and posted (step 255) to the account, thereby negating the debit. In other words, a credit equal in amount to the debit nets a zero amount to the account. In addition to the posting of a credit reversal, the debit is returned (step 260) to the ODFI via the ACH Operator. For example, any debit identified as consumer-oriented is returned as a "R29" (Corporate Customer Advises Not Authorized). Subsequently, the Originator is notified that the debit is unauthorized. The posting of the debit and the credit reversal is reflected in an account statement or report generated (step 270) for the owner of the account, i.e., Receiver.

Upon receipt of the returned debit as R29, the ODFI can recode the debit entry as a commercial transaction if the Receiver's account was correctly specified. Upon the next cycle via the ACH Operator, the recoded debit will be received by the RDFI via another ACH file and steps 210-270 will be performed again. Acceptance of the recoded debit by the RDFI avoids the danger where legitimate transactions could be returned because they are coded as consumer transactions rather than business transactions. If the RDFI customer wants to allow consumer debits against a commercial account, the ACH debit entries are not returned for that customer and particular account.

Referring to FIG. 3, a method 300 of blocking ACH debits is illustrated according to another embodiment of the invention. Similar to the previous embodiment, an ACH batch file is received (step 310) at an RDFI from an ACH Operator. In a preferred embodiment, account numbers of the debit entries are validated (step 320) as account numbers serviced by the RDFI. For each debit, the corresponding account number to be debited is matched (step 330) against a list of commercial RDFI account numbers that are not allowed to post consumer-oriented debit entries. If a match is not found, the debit is allowed to post (step 335) to account 338. Otherwise, it is determined (step 340) whether or not the debit is associated with a consumer-oriented transaction as above. Based on that determination, the debit is allowed to post (step 335) only if the debit entry contains a CCD or CTX standard entry code. If the debit entry is a consumer-oriented transaction, e.g., contains PPD, WEB, TEL, RCK, ARC, POP, or other consumer-oriented standard entry code, the debit entry is returned (step 350) to the ODFI via the ACH Operator without posting to the account. Only the posting of the debit is reflected in an account statement or report generated (step 360) for the owner of the account, i.e., Receiver. If the debit is blocked, the Receiver will see nothing in the account statement or activity report.

In an embodiment of the invention, a commercial Receiver can select among three different ACH debit processing services depending on their needs. In a first ACH processing configuration, all ACH debits presented to a specified account are blocked. This service can also be established to restrict any ACH entry, debit or credit, from posting to an account. In a second ACH processing configuration, only ACH debits from specified Originators are posted to the account, while all others are blocked. Moreover, a dollar limit can be set for ACH debits from each authorized Originator. In a third ACH debit processing configuration, the ACH debit blocking method and system disclosed in the preceding paragraphs is activated. In a preferred embodiment, the third ACH debit processing configuration is the default configuration requiring no instructions by the Receiver customer of the RDFI. The first and second configurations require explicit customer authorization. It is a feature of the invention that automatic return and credit of unauthorized ACH debits can be implemented without explicit authorization from a Receiver customer, because it is presumptively compliant with ACH Rules. Whereas, other configurations require explicit authorization before implementation.

In another embodiment of the invention, a customer can be provided with a warning that they are at risk for fraudulent transactions if they are not automatically blocked and returned.

The present invention protects companies that do not actively reconcile their accounts or those with very active accounts where the activity might be overlooked. This practice is a value-added service to the business customer because it prevents fraudulent activity and eliminates the need for the bank to go to court to recover the funds in cases where fraudulent activity has occurred but was not detected for an extended period of time.

Although the invention has been particularly shown and described with reference to several preferred embodiments thereof, it will be understood by those skilled in the art that various changes in form and details may be made therein without departing from the spirit and scope of the invention as defined in the appended claims.

I claim:

1. A method of blocking an Automated Clearing House (ACH) debit entry from posting to a commercial account, the method comprising:
    identifying a standard entry code (SEC) within an ACH debit entry,
    determining whether the SEC pertains to a commercial-oriented transaction or to a consumer-oriented transaction; and
    blocking said ACH debit entry from posting to the commercial account if the identified SEC pertains to a consumer-oriented transaction.

2. The method of claim 1, wherein said SEC pertaining to a consumer-oriented transaction is one of PPD, WEB, TEL, RCK, ARC, or POP.

3. The method of claim 1, further comprising:
    allowing said ACH debit entry to post to said commercial account if the identified SEC pertains to a commercial-based transaction.

4. The method of claim 3, wherein said SEC pertaining to a commercial based action is one of CCD or CTX.

5. The method of claim 1, wherein said blocking said ACH debit entry comprises returning said ACH debit entry to an Originator of said entry if said identified SEC pertains to a consumer-oriented transaction.

6. The method of claim 5, wherein said returning comprises sending an R29 message.

7. The method of claim 1, further comprising receiving said ACH debit entry.

8. The method of claim 1, wherein said blocking said ACH debit entry comprises:
    posting said ACH debit entry to said commercial account, and
    posting a credit reversal to said commercial account, wherein an amount of said credit reversal is equal to an amount of said ACH debit entry.

9. A computer-readable medium having computer-executable instructions thereon for controlling one or more computer applications for blocking consumer-oriented Automated Clearing House (ACH) debit entries from posting to a commercial account, the instructions comprising:

identifying a standard entry code (SEC) within an ACH debit entry;

determining whether the SEC pertains to a commercial-oriented transaction or to a consumer-oriented transaction; and blocking said ACH debit entry from posting to the commercial account if the identified SEC pertains to a consumer-oriented transaction.

10. The computer-readable medium of claim 9, wherein said SEC pertaining to a consumer-oriented transaction is one of PPD, WEB, TEL, RCK, ARC, or POP.

11. The computer-readable medium of claim 9, further comprising allowing said ACH debit entry to post to said commercial account if the identified SEC pertains to a commercial based transaction.

12. The computer-readable medium of claim 11, wherein said SEC pertaining to a commercial based action is one of CCD or CTX.

13. The computer-readable medium of claim 9, wherein said blocking said ACH debit entry comprises returning said ACH debit entry to an Originator of said entry if said identified SEC pertains to a consumer-oriented transaction.

14. The computer-readable medium of claim 13, wherein said returning comprises sending an R29 message.

15. The computer-readable medium of claim 9, further comprising receiving said ACH debit entry.

16. The computer-readable medium of claim 9, wherein said blocking said ACH debit entry comprises:

posting said ACH debit entry to said commercial account, and posting a credit reversal to said commercial account, wherein an amount of said credit reversal is equal to an amount of said ACH debit entry.

17. A method for blocking unauthorized consumer-oriented Automated Clearing House (ACH) entries into a commercial account, said consumer-oriented ACH entries each indicating an account and an amount, said method comprising:

identifying a transaction type associated with an ACH entry;

identifying an account type associated with said ACH entry; and designating said ACH entry as unauthorized when said transaction type corresponds to a consumer-oriented debit transaction and said account type corresponds to a commercial account.

18. The method of claim 17, wherein said designating further comprises:

preventing an amount associated with said consumer-oriented debit transaction from being applied against said commercial account; and returning said ACH entry to an originating bank.

19. The method of claim 17, wherein said identifying an account type further comprises:

comparing the account indicated by said ACH entry to accounts of a predetermined account type; and determining whether there is a match.

20. The method of claim 17, wherein said designating step further comprises:

posting an amount associated with said consumer-oriented debit transaction against said commercial account;

crediting said amount against said commercial account; and returning said ACH entry to an originating bank.

21. The method of claim 17, wherein said step of identifying the transaction type further comprises:

identifying a standard entry code (SEC) associated with said ACH entry; and designating the transaction type based on said SEC.

22. The method of claim 17, further comprising posting a consumer-oriented ACH credit transaction to the commercial account.

23. A method of blocking an Automated Clearing House (ACH) debit entry, the method comprising:

receiving an instruction that requests a debit to a commercial account;

posting the debit to the commercial account;

determining whether the instruction contains a standard entry code (SEC) that pertains to a consumer-oriented transaction; and generating a credit reversal in an amount equal to the debit and posting the credit reversal to the commercial account to thereby negate the debit if the SEC pertains to a consumer-oriented transaction.

24. The method of claim 23, further comprising:

receiving an instruction that requests a credit to a commercial account; and posting the credit to the commercial account.

\* \* \* \* \*